United States Patent
Tsai

(10) Patent No.: US 7,356,624 B1
(45) Date of Patent: Apr. 8, 2008

(54) INTERFACE BETWEEN DIFFERENT CLOCK RATE COMPONENTS

(75) Inventor: Mandy Mei-Feng Tsai, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/535,226

(22) Filed: Mar. 24, 2000

Related U.S. Application Data

(60) Provisional application No. 60/126,079, filed on Mar. 25, 1999.

(51) Int. Cl.
G06F 3/00 (2006.01)
G06F 12/00 (2006.01)

(52) U.S. Cl. .............................. 710/52; 710/53; 710/54; 710/55; 710/56; 710/57; 711/100

(58) Field of Classification Search ............ 710/52–57, 710/58, 60
See application file for complete search history.

(56) References Cited

U.S. PATENT DOCUMENTS

| | | | |
|---|---|---|---|
| 4,463,443 A | * | 7/1984 | Frankel et al. ................. 710/60 |
| 4,616,338 A | * | 10/1986 | Helen et al. ................... 710/53 |
| 5,058,114 A | * | 10/1991 | Kuboki et al. ................. 714/38 |
| 5,212,778 A | * | 5/1993 | Dally et al. .................. 711/218 |
| 5,561,672 A | * | 10/1996 | Kaneko ........................ 710/53 |
| 5,809,521 A | * | 9/1998 | Steinmetz et al. ............. 710/57 |
| 5,832,308 A | * | 11/1998 | Nakamura et al. ............ 710/53 |
| 5,884,099 A | * | 3/1999 | Klingelhofer ................ 710/52 |
| 5,982,772 A | * | 11/1999 | Oskouy .................... 370/395.7 |

* cited by examiner

*Primary Examiner*—Alan S. Chen
(74) *Attorney, Agent, or Firm*—Robert D. Marshall, Jr.; W. James Brady; Frederick J. Telecky, Jr.

(57) ABSTRACT

A circuit for interfacing between a first component 11 operating at a first clock rate and a second component 12 operating at a second clock rate, wherein the second clock rate is higher than the first clock rate. The circuit comprises a first buffer 13 coupled to the first component 11; a second buffer 14 coupled to the second component 12; and a copy/access controller 15, 16, 17 connected to the first buffer 13, the second buffer 14, and the second component 12. The copy/access controller 15, 16, 17 is operable to copy data from the first buffer 13 to the second buffer 14 when the first buffer 13 is substantially full. It is also operable to prompt the second component 12 to access the second buffer 14 when the data is copied from the first buffer 13. The buffers can be random access memories or shift registers, and can be integrated onto the same semiconductor die as either the first or second component.

4 Claims, 2 Drawing Sheets

INTERFACE BETWEEN DIFFERENT CLOCK RATE COMPONENTS

CROSS-REFERENCE TO COPENDING APPLICATION

This application claims the benefit of U.S. Provisional Application No. 60/126,079, filed on Mar. 25, 1999, the entire disclosure of which is hereby incorporated herein by reference.

FIELD OF THE INVENTION

The present invention relates to digital signal processing. More particularly, the present invention relates to a method and a circuit for interfacing a low clock rate component with a high clock rate component.

BACKGROUND OF THE INVENTION

In the field of digital signal processing, the need for interfacing a low clock rate component with a high clock rate component is very common. For example, in a digital still camera, real-time data from a charge-coupled device (CCD) is transferred to a high speed memory, such as a synchronous dynamic random access memory (SDRAM). For these purposes, "real-time" means that data is transferred at a rate fast enough to avoid a perceivable delay in operation of the system, in this example, a digital still camera. The CCD operates at a clock rate of about 12 MHz, while the SDRAM operates at a clock rate of about 54 MHz. To smooth the transfer of the real-time data flow, an interface between the low clock rate CCD and the high clock rate SDRAM is needed to accommodate the difference between the clock rates.

There are two primary prior art approaches for the interface of two components having different operating speeds: a First-In-First-out (FIFO) buffering configuration and a dual-port memory buffering configuration.

A diagram of a prior art FIFO configuration is shown in FIG. 1. FIFO comprises a memory 2 that is accessible by the data source 4 anytime there is space available and is accessible by the destination 6 anytime there is data available from the source. FIFO also comprises hardware control logic 8, such as a read/write access pointer controller, to control the access to the FIFO by both the data source and the destination so as to ensure that the data will be transferred correctly. In the case that the clock rate of the data source is higher than that of the destination, the control logic must detect when the memory of the FIFO is full and send a signal to the data source, if the memory is detected as full, to hold the data transmitted from the source until the memory is detected as nearly empty. In the other case when the clock rate of the destination is higher than that of the data source, the control logic must detect when the memory of the FIFO is empty or nearly empty and send a signal to the destination, if the memory is detected as empty or nearly empty, to hold the access to the FIFO by the destination until the memory is detected as full. This operation requires relatively complex control logic and a relatively long timing delay, which slows down the performance of the component with the higher clock rate. Such a solution is practical only if using a slow clock source.

Dual-port memory circuits (i.e. a memory array accessible by two ports) are a more versatile form of time domain boundary buffer. The read and write operations of a dual-port buffer are based on address rather than write order, thereby allowing the reading of data in a different order than it was written in, for example. Lock-outs are used in a dual-port buffer to prevent reading from a memory element while it is being written. Dual-port buffers can be arranged to not slow down the performance of the component with the higher clock rate if the read/write operations are coordinated properly. Unfortunately, the implementation of a dual-port buffer is more complicated than that of a FIFO and is difficult to integrate into an integrated circuit die. Hence, a dual port memory is typically used as a discrete component, adding to system size and complexity. In addition, the manufacturing costs of dual-port buffers are comparatively higher than single-port memory circuits.

There is therefore a need in the industry for a cost-effective interface solution that allows real-time data transfer between two components having different clock rates.

SUMMARY OF THE INVENTION

In one embodiment of the invention, a circuit for interfacing between a first component operating at a first clock rate and a second component operating at a second clock rate, wherein the second clock rate is higher than the first clock rate, is disclosed. The circuit comprises a first buffer coupled to the first component; a second buffer coupled to the second component; and a copy/access controller connected to the first buffer, the second buffer, and the second component. The copy/access controller is operable to copy data from the first buffer to the second buffer when the first buffer is substantially full. It is also operable to prompt the second component to access the second buffer when the data is copied from the first buffer. The buffers can be random access memories or shift registers, and can be integrated onto the same semiconductor die as either the first or second component.

In another embodiment of the invention, a circuit for transferring a real-time data flow from a first component operable at a first clock rate to a second component operable at a second clock rate is disclosed, wherein the second clock rate is higher than the first clock rate. The circuit comprises a first clock signal source of the first clock rate; a second clock signal source of the second clock rate; a first buffer operable at either the first clock rate or the second clock rate and coupled to the first component and the second component; a second buffer operable at either the first clock rate or the second clock rate and coupled to the first component and the second component. The circuit also includes a clock switch coupled to the first buffer and to the second buffer and coupled to the first and second clock signal sources. The clock switch is operable to couple the first clock signal source to either the first buffer or the second buffer and is operable to couple the second clock signal source to the other of the first buffer and the second buffer when one of the buffers is substantially full.

An advantage of the invention is that it provides an interface between two different speed components using cost-effective single port memory circuits rather than dual port memories.

BRIEF DESCRIPTION OF THE DRAWINGS

Other aspects and advantages of the present invention will become apparent from the following descriptions taken in conjunction with the accompanying drawings, wherein.

DETAILED DESCRIPTION OF EMBODIMENTS OF THE INVENTION

Figure 1:
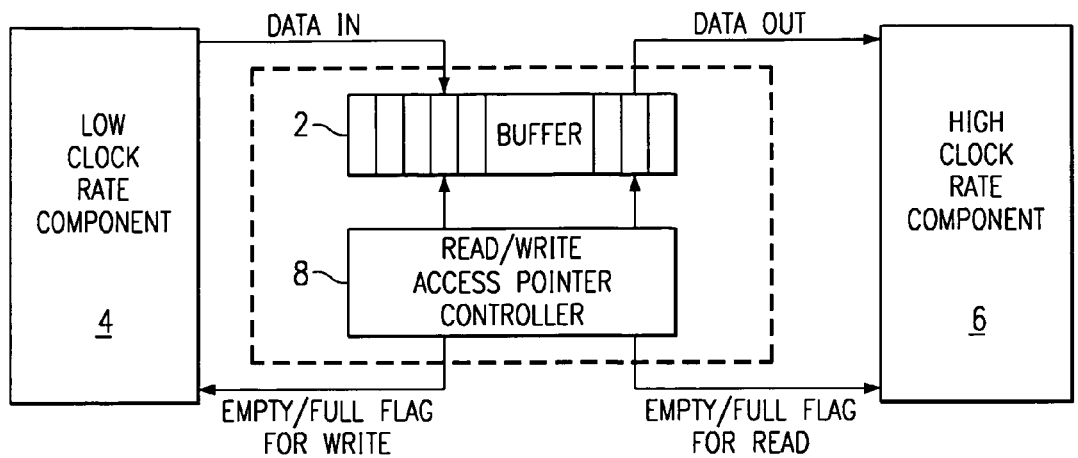
FIG. 1 shows a prior art FIFO configuration.

A ping-pong buffer generally comprises two memory elements that can be written to and read from alternately. In the usual situation, one memory element (e.g. the "ping" buffer) is filled with data while the other memory element (e.g. the "pong" buffer) has its data read by another component. This eliminates the delay that would occur if the incoming data, for example, had to be suspended while the data in the buffer is being read. The ability of ping-pong buffers to handle uninterrupted streams of data can be used as a solution for interfacing electronic components having two different operating speeds or clock rates.

Reference now will be made in detail to the preferred embodiments of the present invention as illustrated in the accompanying drawings in which like reference numerals designate like or corresponding elements throughout the drawings.

Figure 2:
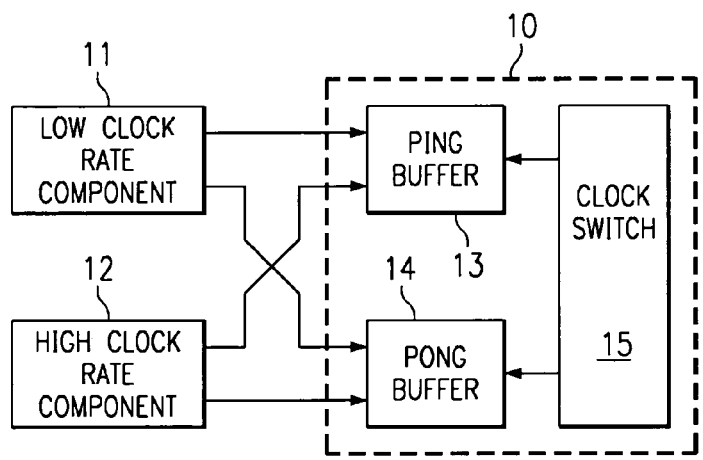
FIG. 2 shows a block diagram of a first embodiment of the present invention.

FIG. 2 illustrates a first embodiment of the present invention, wherein a ping-pong buffer 10 is used as an interface between a low clock rate component 11 (e.g. a CCD operable at about 12 MHz or a TV data output operable at 13.5 MHz) and a high clock rate component 12 (e.g. an SDRAM operable at about 54 MHz) in a real-time application. The ping-pong buffer 10 comprises a ping buffer 13, a pong buffer 14 and a clock switch 15. The buffers can be any size, such as 8 by 32-bits for example, and comprise a memory device such as a shift register comprising D Flip-Flops or a RAM. The clock rate of the ping buffer 13 can be switched between a clock signal source (not shown) at the clock rate of the component 11 and a clock signal source (not shown) at the clock rate of the component 12. The ping buffer 13 can be accessed by the component 11 if it is operating at the clock rate of the component 11, and it can be accessed by the component 12 if it is operating at the clock rate of the component 12. Access between the components 11 and 12 and the ping 13 and pong 14 buffers can be controlled using an address pointer controller 16 and a comparator 17. Similarly, the clock rate of the pong buffer 14 can also be switched between the clock rate of the component 11 and the clock rate of the component 12. And when the pong buffer 14 is operating at the clock rate of the component 11, it can be accessed by the component 11, while if it is operating at the clock rate of the component 12, it can be accessed by the component 12. The clock switch 15 is coupled to both the ping buffer 13 and the pong buffer 14 and switches between the clock sources.

In one example, the ping buffer 13 operates at the clock rate of the component 11 and is receiving a real-time data flow from the component 11. When the ping buffer 13 is full, the clock switch 15 switches from the clock signal source for the clock rate of the ping buffer 13 to clock signal source for the clock rate of the component 12 and switches the clock signal source for the clock rate of the pong buffer 14 to the clock signal source for the clock rate of the component 11, such that the component 12 can obtain the data from the ping buffer 13 and the pong buffer 14 can continue receiving the real-time data flow from the component 11. Similarly, when the pong buffer 14 is full, the clock switch 15 will again exchange the clock rates of the ping buffer 13 and the pong buffer 14 to let the component 12 obtain data from the pong buffer 14 and let the ping buffer 13 continue receiving real-time data flow from component 11.

To determine whether the ping buffer 13 or the pong buffer 14 is full or not, the ping-pong buffer 10 may include a counter. A predetermined number corresponding to the capacity of each of the ping buffer 13 and the pong buffer 14 is set in the counter. At first, the counter is set to zero. In addition, each time the clock rates of the ping buffer 13 and the pong buffer 14 are switched, the counter is reset to zero. When each vacancy of the ping buffer 13 or the pong buffer 14 is occupied by a datum from the component 11, the counter is increased by one. When the counter reaches the predetermined number, the clock switch 15 executes the switching of the clock rates of the ping buffer 13 and the pong buffer 14. In some applications, the predetermined number may be set to correspond to the condition that the ping buffer 13 or the pong buffer 14 is nearly full but not completely full, to prevent the switching of clock rates from causing interruptions to the receiving of the real-time data flow. In brief, the switching of clock rates is executed when one of the ping buffer 13 and the pong buffer 14 that is receiving data from the component 11 is substantially full (i.e., the buffer is full or nearly full). In addition, the predetermined numbers corresponding to the capacities of the ping buffer 13 and the pong buffer 14 respectively may be different if the capacities of the ping buffer 13 and the pong buffer 14 are different.

Figure 3:
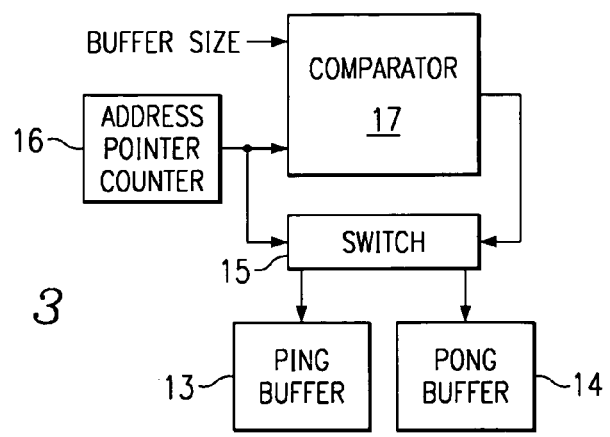
FIG. 3 shows a block diagram of a clock switching circuit of said first embodiment of the present invention.

FIG. 3 shows one method for switching between the components 11 and 12 and the buffers 13 and 14. The output of a pointer counter 16 indicates which buffer 13 or 14 is accessible by a component at a given time. Once the counter value is equal to the buffer size (as determined by comparator 17), the comparator issues a signal to switch 15 so that the component 11 or 12 can access the other buffer 13 or 14. The switch also reverses the connection of the two different clock sources to the buffers 13 and 14 at this time.

The circuit of the ping-pong buffer 10 of the present invention is much simpler than that of a FIFO or a dual-port buffer and can be more easily integrated onto the same semiconductor die as either the component 11 or the component 12. A reason for this is that in the ping-pong buffer approach, the components 11 and 12 do not require any status feedback from the ping or pong buffers. The buffer operation depends only on the passive counter and comparator logic. The components 11 and 12 can therefore read or write without stopping or slowing the data transfer to allow for status logic delay. Conversely, in the FIFO approach the FIFO and high and low clock rate components handshake and operate in accordance with a FULL/EMPTY flag. Handshake logic is performed with decision circuits in both the FIFO and the high and low clock rate components, a more complex and space-consuming configuration than is required in the ping-pong buffer implementation. The dual-port memory approach suffers from the same complexity drawbacks, but also has the added disadvantage of the inherently higher cost of the memory itself.

Figure 4:
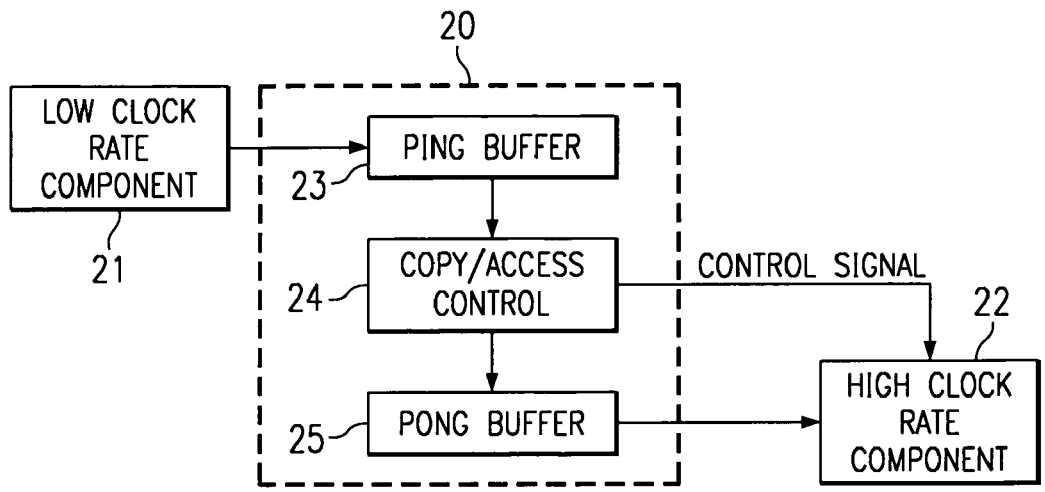
FIG. 4 shows a block diagram of a second embodiment of the present invention.

FIG. 4 illustrates a second embodiment of the present invention wherein a ping-pong buffer 20 is used as an interface between a low clock rate component 21 and a high clock rate component 22. As compared with the first embodiment, the structure and mechanism of the second embodiment is further simplified because the clock switch is eliminated and each buffer need only be operable at a single clock rate. Operating a component at a single clock rate has the advantage of eliminating potential uncertainty that can result from phase delays between multiple clock sources.

The ping-pong buffer 20 of the second embodiment comprises a ping buffer 23, a copy/access controller 24 and a pong buffer 25. The ping buffer 23 is used for receiving data from the component 21 and operates at the clock rate of the component 21. The pong buffer 25 is accessed by the component 22 and operates at the clock rate of the component 22. When the ping buffer 23 is full, the copy/access controller 24 executes a copy operation to copy data from the ping buffer 23 to the pong buffer 25. When the copy operation is completed, the copy/access controller 24 sends a signal to the component 22 to let the component 22 obtain data from the pong buffer 25, and at the same time, the ping buffer 23 continues receiving data from the component 21. As with the first embodiment mentioned above, the second embodiment circuit can include a counter to indicate when the ping buffer 23 is full or nearly-full.

Figure 5:
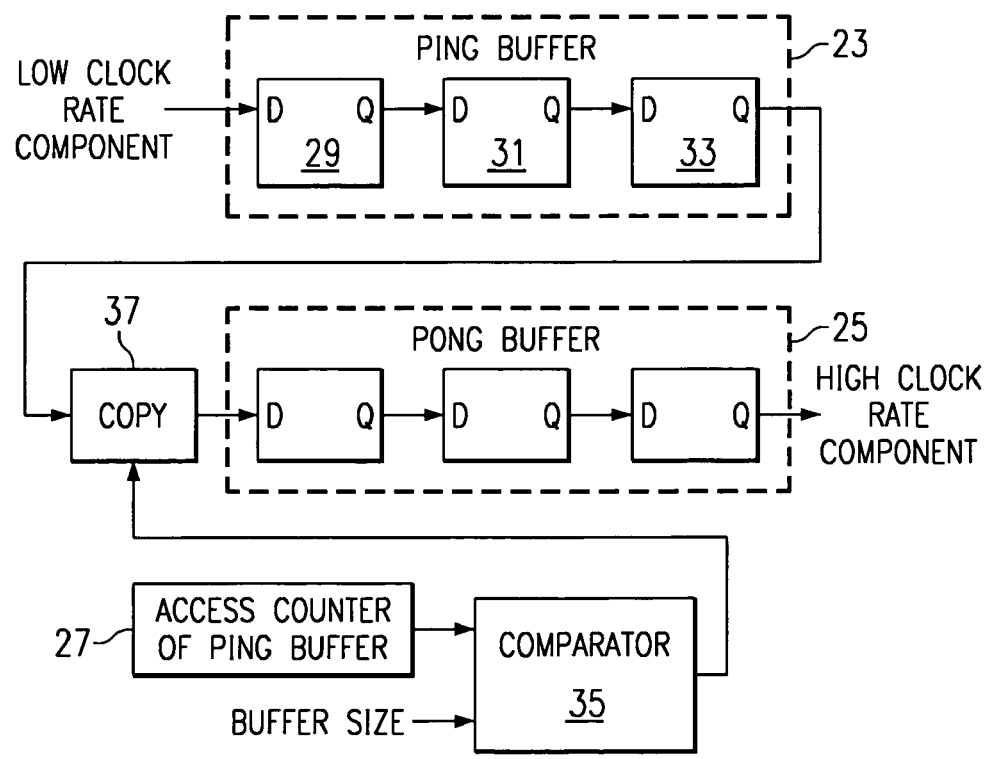
FIG. 5 shows a block diagram of copy/access circuitry of said second embodiment of the present invention.

FIG. 5 is a schematic diagram of a copy/access controller. Access counter 27 is increased by one when data shifts from one D Flip-Flop 29 to the next D Flip-Flop 31 in ping buffer 23. Once data shifts to the end of the ping buffer (i.e. to D Flip-Flop 33), the counter 27 value is equal to the buffer size. Comparator 35 then generates a load signal to COPY logic 37 to allow the data in ping buffer 23 to be copied to pong buffer 25. The copy operation takes one cycle of the low clock signal.

In another embodiment of the invention, each of the ping buffer 23 and the pong buffer 25 of the second embodiment can be implemented by using a RAM. This approach is slightly more complicated since data addresses and data address logic are needed in the copy operation between the two memories.

The technical features and technical contents of the present invention have been fully disclosed as above. However, various modifications or replacements can be made by people skilled in the art based on the disclosure and teaching of the present invention without departing from the spirit of the present invention. Therefore, the scope of the present invention shall not be limited to the above-disclosed embodiments and should include these modifications and replacements.

What is claimed is:

1. A circuit for interfacing between a first component operating at a first clock rate and a second component operating at a second clock rate wherein said second clock rate is higher than said first clock rate, said circuit comprising:
   a first buffer coupled to said first component, said first buffer receiving and storing data received from said first component at said first clock rate;
   a second buffer coupled to said second component, said second buffer supplying data recalled therefrom to said second component at said second clock rate;
   a copy/access controller connected to said first buffer, said second buffer, and said second component, said copy/access controller including
      a counter operable to count each time data is stored in said first buffer,
      a comparator having a first input receiving said count of said counter and a second input receiving a buffer size signal indicative of a size of said first buffer, said comparator operable when said count equals said buffer size to generate a load signal
         to copy data from said first buffer to said second buffer and
         to prompt said second component to access said second buffer.

2. The circuit as set forth in claim 1, wherein both said first buffer and said second buffer are random-access memories.

3. The circuit as set forth in claim 1, wherein both said first buffer and said second buffer are shift registers.

4. The circuit as set forth in claim 1, wherein said circuit is integrated onto a semiconductor die with one of said first component or said second component.

* * * * *